UNITED STATES PATENT OFFICE.

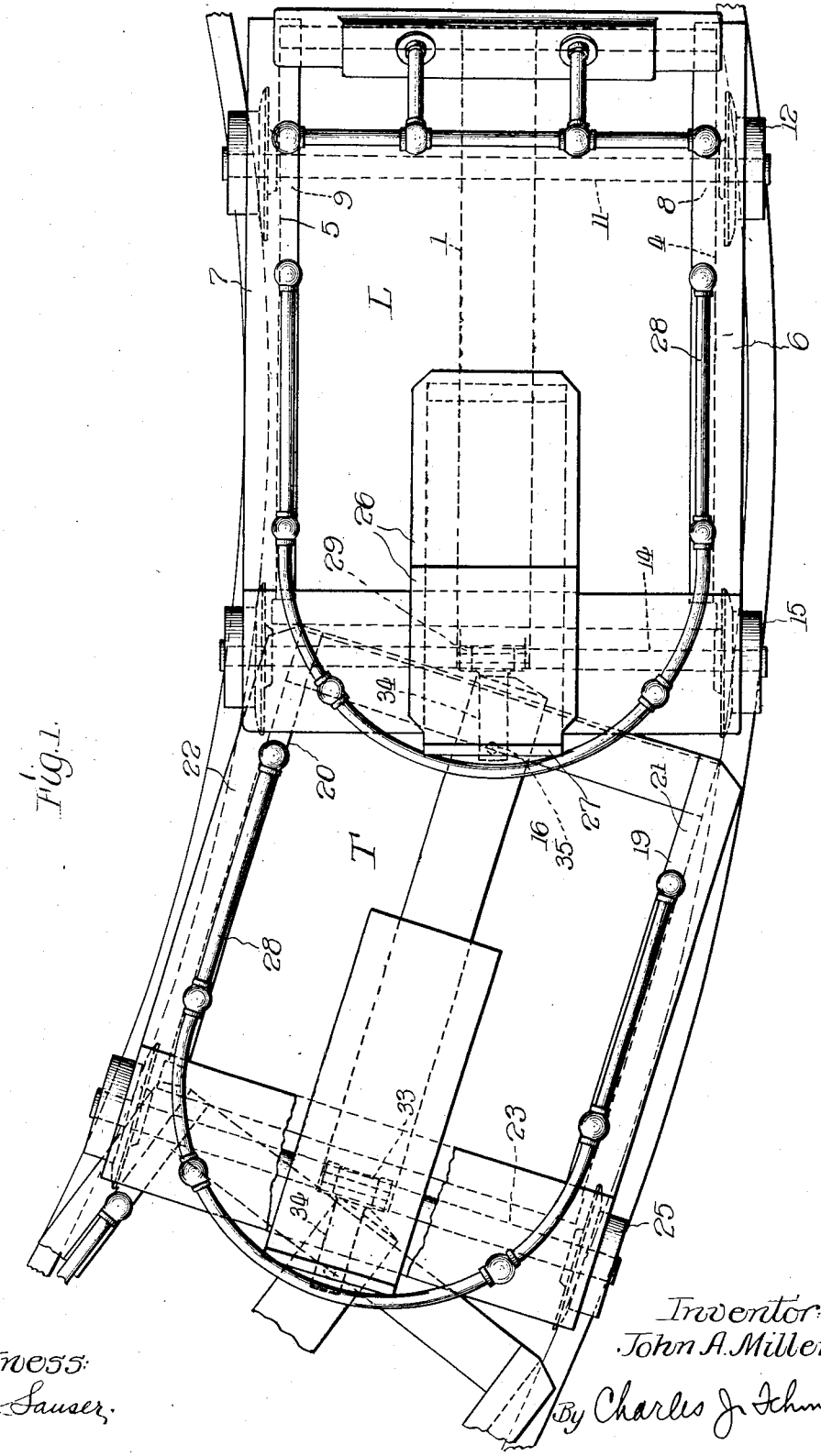

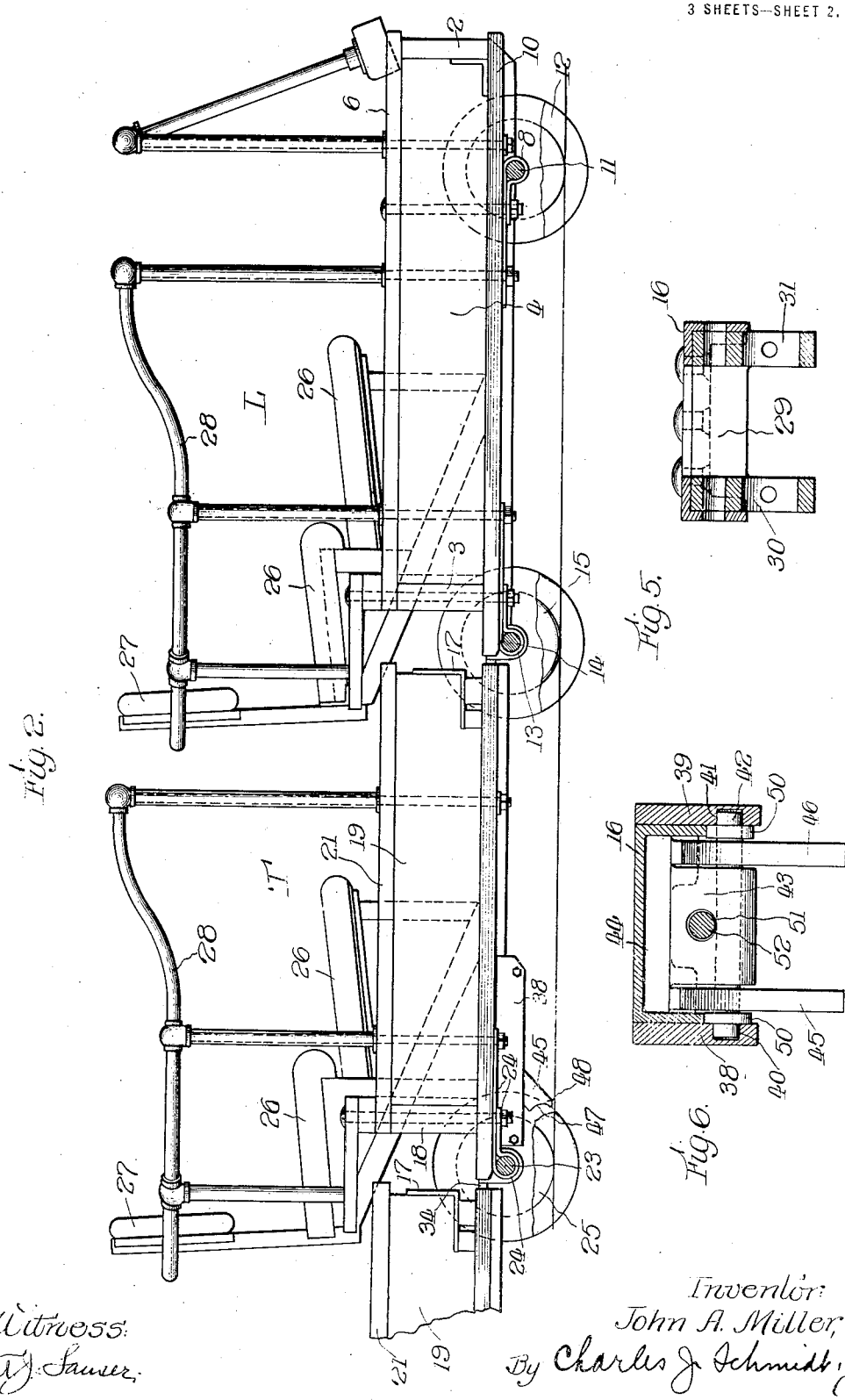

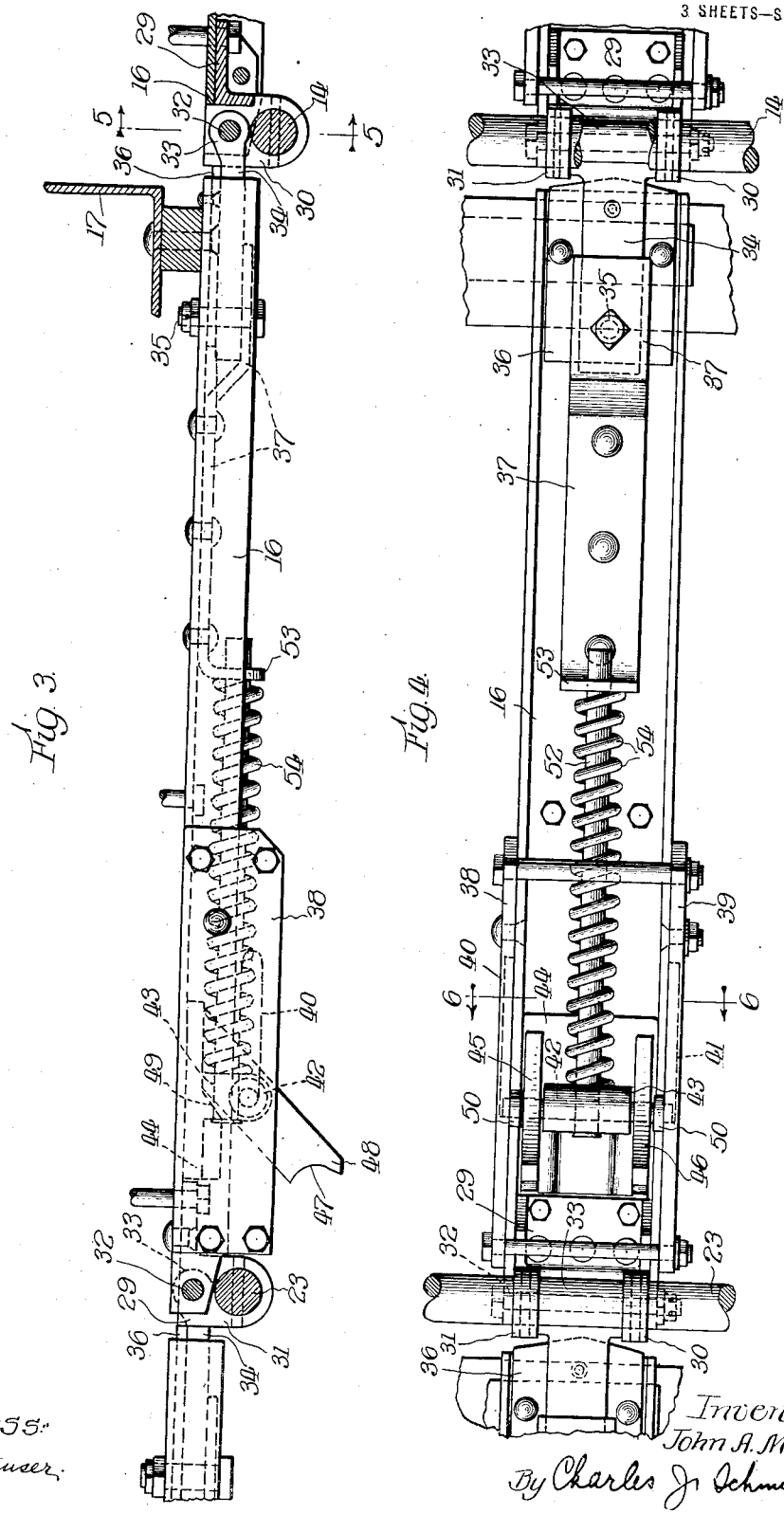

JOHN A. MILLER, OF HOMEWOOD, ILLINOIS.

PLEASURE RAILWAY.

1,409,751.  Specification of Letters Patent.  Patented Mar. 14, 1922.

Application filed May 27, 1921. Serial No. 472,949.

*To all whom it may concern:*

Be it known that I, JOHN A. MILLER, a citizen of the United States, and a resident of Homewood, in the county of Cook, State of Illinois, have invented certain new and useful Improvements in Pleasure Railways, of which the following is a specification.

My invention relates to pleasure railways, such as are installed in amusement parks or resorts, and covers particularly improved construction of train units and their coupling together so that the trains may readily and safely take short and sudden curves and abrupt dips and summits.

In my improved arrangement a train is composed of a leader car or unit having four or more wheels and a number of trailers having each only a rear axle and each supported at its front end from the rear end of the preceding unit. The units are short and improved coupling mechanism is provided and so connected between the units that a train is exceedingly flexible, and the axles caused to assume the most advantageous and safe angle with reference to the track curvature so that the train may freely and safely travel around short and sudden curves and over abrupt dips and summits.

Another important object of the invention is to provide improved resilient hoisting or safety dog construction by means of which the pull on the hoisting chain is conveyed individually to the train units, or when the train is caught on a safety chain or ratchet, this construction relieving the coupling mechanism between units from undue strain.

The above and other features of my invention are described in detail in the following specification taken with the accompanying drawings, in which drawings—

Fig. 1 is a plan view of a train with parts broken away,

Fig. 2 is a side elevational view with parts broken away,

Fig. 3 is an enlarged side elevational view of the car body supporting channel beam structure, Fig. 4 is a bottom side view of such beam structure, Fig. 5 is an enlarged sectional view on plane 5—5, Fig. 3 and Fig. 6 is an enlarged sectional view on plane 6—6, Fig. 4.

The leader unit or car of the train is represented as a whole by L and the various trailer units are represented by T. A channel beam 1 with its flanges projecting downwardly forms the main support of the leader car and extends from front to rear thereof along the center. The transverse beams 2 and 3 at the front and rear of the leader car are secured on the channel beam, the side walls 4 and 5 being surmounted by the guard or step boards 6 and 7. Bearings 8 and 9 secured to the floor 10 at the front of the car secure the front axle 11 on whose ends are mounted the front wheels 12. Similar bearings 13 at the rear corners of the leader car secure the rear axle 14 on whose ends are journaled the flanged wheels 15.

A channel beam 16 with its flanges projecting down forms the main support for each of the trailer units and extends from front to rear thereof along the center. The body construction is similar to that of the leader unit, a front metallic angle beam 17 and a rear beam 18 extending transversely and secured on the ends of the channel beam and the sides 19 and 20 being surmounted by the guard or step platforms 21 and 22. Each trailer unit has only a rear axle 23 secured in fittings 24 at the rear corners of the car floor, each axle journaling at its ends the wheels 25. The floor of the leader car and of each trailer car extend a distance rearwardly behind the rear transverse beam of the car body so that the axles will be to the rear of such beams. Each car has suitable super-structure providing tandem seats 26, the rear seat in each unit overhanging the rear axle. For the rear seat section a back structure 27 is provided and suitable railings 28 afford support for the occupants of the cars.

At the end of each channel beam and between the flanges thereof is secured a fitting or bracket 29 from which extend the ears 30 and 31 through whose lower part the respective axles extend, the axles being thus further rigidly supported from the channel beam. The ears at their upper ends have opposite holes for receiving the coupling pin 32 which receives the head 33 of the draw bar 34. A draw bar is provided at the front end of the channel beam of each of the trailer units, the bar being pivoted at its inner end a distance inwardly from the front end of the channel beam by means of a king bolt 35 passing through the beam web. The draw bar rests against a wearing plate 36 secured against the inside of the beam web, and a brace 37 secured at its inner end against the beam web deflects at its outer end to extend below the draw bar, the king bolt extending through the brace to confine the draw bar between such brace and the wearing plate 36. The draw bars are thus held against vertical movement but may swing freely laterally between the flanges of the channel beams. The weight at the front section of each trailer unit is communicated from the wearing plate 36 to the draw bar and by the draw bar to the rear axle of the preceding unit, the head of each draw bar being above the axle of the supporting vehicle. As the train travels around curves and over inclines and summits the draw bars swing laterally on the respective channel bars and the channel bars swing relatively vertically by virtue of the pivotal connections of the draw bars from one vehicle to the other. The front end of the body of each trailer unit extends a distance below the overhanging rear seat section of the preceding unit but sufficient clearance is allowed so that the vehicle bodies cannot bump each other while the train travels around curves and over dips and summits. The shortness of the units facilitates the ease of travel of the train over the track, and the location of the king pin intermediate the ends of the vehicles is such that the axles will be given the most advantageous angles with reference to the track curvature and to reduce the trackage friction to a minimum. The seat structure in each unit being also well to the rear of the unit and over the rear axle, the weight will be mostly over the axles and the wheels will hold the rails. Furthermore the occupants will not be subjected to violent side movement as the units round short curves. The train is thus exceedingly flexible, easy riding, and safe.

In the operation of gravity pleasure railways an endless chain is usually provided for hauling a train to the summit of the first incline from which the train then travels by gravity over lesser summits and around curves and returns to the starting platform. In hauling a train to the top of the starting summit it is desirable to eliminate excessive strain on the coupling draw bars to guard against separation of units while traveling up the steep incline to the starting point. I accomplish this by providing improved resilient connection between each unit of a train and the hoisting chain. Referring particularly to Figs. 3, 4, and 6, I secure the plates 38 and 39 against the outer sides of each channel beam near the rear end thereof, these plates extending downwardly a distance below the flanges of the beams. The plates have the opposite horizontal channels 40 and 41 for receiving the ends of the pin 42 extending transversely through the dog carriage 43, the carriage having the top or guide plate 44 extending between the flanges of the channel beam and below the web thereof. Adjacent the ends of the carriage body 43 the pin 42 carries the dogs 45 and 46 which extend diagonally downwardly and rearwardly below the walls 38 and 39 and which at their lower ends have each the concavity 47 and point 48 which enable them to engage with the links of a hoisting chain. The weight of the dogs below their pivot pin is such that normally they will hang down with their upper ends against the top wall 44 of the carriage. When the dogs drag over the chain they will swing against the abutment 49 provided on the top plate 44. To properly aline the dogs and to keep them clear of the channel beam flanges washers 50 are inserted between the dogs and the walls 38 and 39.

The carriage body 43 has the threaded opening 51 for receiving the rear end of a rod 52 which at its front end extends through the downwardly deflected inner end 53 of the brace 37 which assists in supporting the draw bar. Between this abutment end 53 and the carriage 43 the rod carries the compression spring 54. The spring normally holds the dog carriage at the rear end of its travel with the pin 42 abutting against the rear ends of the channels 40 and 41. When the train is pushed into the path of the hoisting chain the train units are connected in succession by means of their hoisting dogs with the chain, and immediately upon engagement of a set of dogs with the chain the corresponding spring is compressed, and the propulsion of the units is thus taken up yieldingly and individually by the respective springs. In other words the pull of the hoisting chain is communicated individually to the units and wear and tear on the draw bars is eliminated, the yielding connection afforded by the springs preventing jerking and causing the train to be easily and smoothly hauled up to the starting summit. During compression and vibration of the springs the dog carriage shifts back and forth on its support, and when the train leaves the starting summit the dogs will be freed from the chain and the carriages will be shifted to their rear positions by the springs.

As a safety precaution stop chains or racks are provided on the inclines leading to summits over which the dogs readily trail during normal operation of a train. However should a train fail to reach the top of a summit or should a car become uncoupled during ascent of the train the dogs will immediately catch in the stop chain or rack and the train or car will be stopped, such stoppage being cushioned by the springs back of the dog carriages.

Having described my invention, I claim as follows:

1. In a pleasure railway, the combination of a plurality of units each having a rear axle, a draw bar pivoted to each unit intermediate its ends and connected at its outer end with the rear end of the preceding unit, the front end of each unit resting on its draw bar.

2. In a pleasure railway, the combination of a plurality of train units each having a rear axle, a draw bar pivoted at the end of each unit for vertical swing, each draw bar being pivoted at its outer end to the preceding unit intermediate the ends of said unit, the front end of each unit resting and being slidable on the respective draw bar as the train travels.

3. In a pleasure railway, the combination of a plurality of units forming a train and each having a rear axle, a fitting receiving each rear axle at the center thereof, a draw bar pivoted on said fitting for vertical swing, each draw bar at its outer end being pivoted to the underside of the succeeding unit intermediate the ends of such unit, each unit at its front end resting and being slidable on the respective draw bar while the train travels around curves.

4. In a pleasure railway, the combination of a plurality of units each having only a rear axle, a channel beam extending longitudinally along the center of each unit, a fitting on the end of each channel beam receiving the respective axle, a draw bar pivoted to each fitting and secured at its outer end to the succeeding vehicle channel beam a distance inwardly from the front end of such beam, each beam at its front end resting on the respective draw bar.

5. In a trailer car for pleasure railway trains, the combination of the car body, a channel beam extending from front to rear of the car at the center thereof with its flanges extending downwardly below the car body, a draw bar pivoted at its inner end to said channel beam a distance inwardly from the end thereof, means for confining said bar on said beam to lateral swing, a fitting at the rear end of said channel beam, and a pin in said fitting for receiving the outer end of the draw bar of an adjacent vehicle.

6. In a trailer car for pleasure railways, the combination of the car body, a supporting beam running lengthwise of the car at the center line thereof, a draw bar pivoted at its inner end to the front end of said beam a distance inwardly from the beam ends, said bar being confined to swing only laterally, a fitting secured to the rear end of said beam, a rear axle for said car received by said fitting and having wheels, and a pivot pin secured by said fitting for receiving the outer end of the draw bar of a succeeding car.

7. In a car for pleasure railway trains, the combination of the car body, a channel beam extending longitudinally of said body along the center line and with its flanges extending downwardly, a draw bar pivoted against the under side of said channel beam a distance inwardly from the front end thereof and having a pivot head at its outer end, a fitting secured to the rear end of said channel beam, a pivot pin on said fitting for receiving the pivot head of the draw bar of the succeeding car, a carriage slidable on said channel beam, a dog hung from said carriage to engage with a hoisting chain, an abutment on said beam, and a compression spring interposed between said abutment and said carriage whereby pressure on said dog is gradually taken up.

8. In a car for pleasure railways, the combination of the car body, a carriage mounted to reciprocate on the bottom of said body, a spring resisting movement of said carriage in one direction, a dog pivoted intermediate its end on said carriage, said dog when engaged at its lower end on one side being free to swing relative to the carriage, said dog when engaged at its other side abutting at its upper end against the carriage and causing shift of the carriage against the force of said spring.

9. In a car for pleasure railways, the combination of the car body, walls depending from the body, a carriage supported on said walls to shift longitudinally of the body, a spring connected between said carriage and body for resisting movement thereof in one direction, a dog pivoted intermediate its ends on said carriage, pressure against said dog at its lower end in one direction causing said dog to swing independently of said carriage, and pressure against said dog on the other side below its pivot causing it to engage at its upper end against the carriage and causing the carriage to be shifted against the force of the spring.

In witness whereof, I hereunto subscribe my name this 24th day of May, A. D., 1921.

JOHN A. MILLER.